J. P. TURNER.
JOINT CLAMP.
APPLICATION FILED JUNE 10, 1915.
1,226,419.
Patented May 15, 1917.
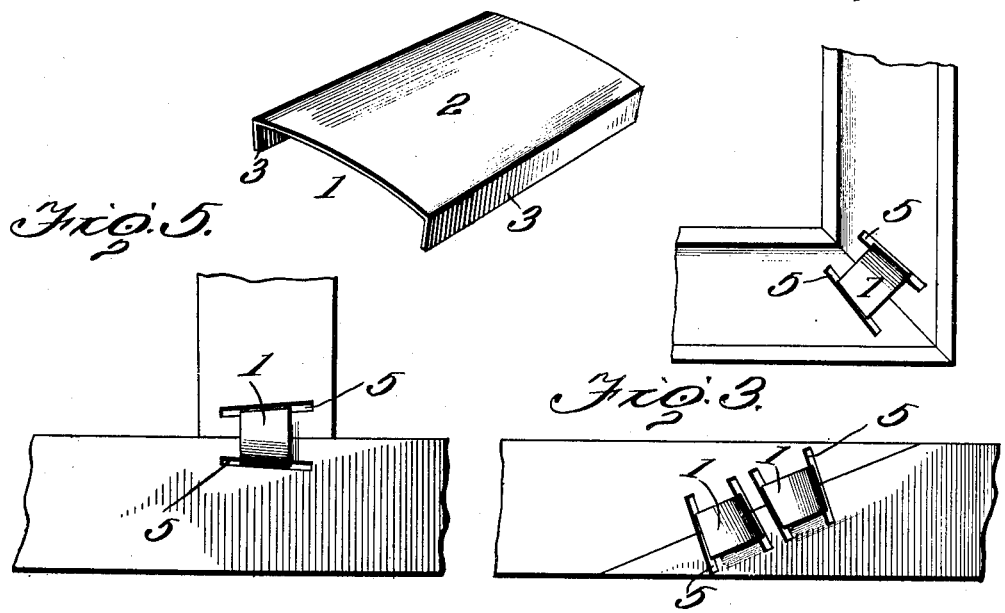
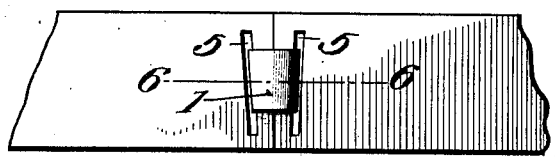
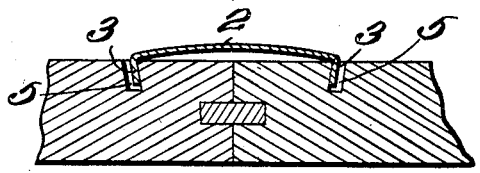
Inventor
Joseph P. Turner
Witnesses
By
Attorney

UNITED STATES PATENT OFFICE.

JOSEPH PHILIP TURNER, OF RIDGWAY, PENNSYLVANIA, ASSIGNOR TO HYDE-MURPHY COMPANY, OF RIDGWAY, PENNSYLVANIA, A CORPORATION OF PENNSYLVANIA.

JOINT-CLAMP.

1,226,419.      Specification of Letters Patent.      Patented May 15, 1917.

Application filed June 10, 1915. Serial No. 33,323.

*To all whom it may concern:*

Be it known that I, JOSEPH P. TURNER, of Ridgway, in the county of Elk and State of Pennsylvania, have invented certain new and useful Improvements in Joint-Clamps; and I do hereby declare the following to be a full, clear, and exact description of the invention, such as will enable others skilled in the art to which it appertains to make and use the same.

The object of my invention is to provide a simple and efficient locking clamp for quickly and permanently fastening miter joints, end joints or side joints in wood or metal, the device being particularly adapted for use in connection with paneling, wainscoting, skeleton framing, and other work which is shipped in a knocked-down form and designed to be assembled at distant points.

In the accompanying drawings, Figure 1 is a view in perspective of the clamp. Figs. 2, 3, 4 and 5 show the application of the clamp to various forms of joints. Fig. 6 is a sectional view on line 6—6, Fig. 4.

Referring to the drawings, 1 designates a clamping plate of wedge-shape preferably formed of steel and comprising a bowed or convex portion 2 and side flanges or key angles 3, the flanges being bent downwardly and inwardly at an acute angle to the bowed portion 2.

The clamp is primarily designed for use in joining the edges of window and door trims, moldings for large openings, and other construction work which is milled and finished at points distant from the place where it is to be used, and in order that the joints may be easily and quickly made the rear faces of the material to be so joined are formed with grooves 5 which are cut into the material on convergent lines. As shown in Figs. 2, 4, 5 and 6, one groove is formed in each of the two parts to be joined, the key angles of the clamp taking in these grooves and when forced into wedging action holding the contiguous edges of the joint in close union the key angles firmly gripping the adjacent convergent walls of complementary grooves. The bowed portion of the clamping plate in connection with the flanges exerts a constant pressure on the abutting edges of the parts, thus insuring a snug fit at all times, and equalizing swellings or shrinkage caused by temperature or climatic changes.

As shown in Fig. 3, in lap-jointing it is preferable to employ two clamps with corresponding grooves, the latter being formed crosswise of the joint, the pairs of grooves being so arranged that the clamping plates may be inserted from opposite ends. That is to say, there is a wedging action in opposite directions by the wide end of one clamp being on one side of the joint and the wide end of the other on the opposite. This insures a firm joint and prevents any danger of lineal or lateral separation.

In practice, the parts to be joined are suitably prepared by mortising, tenoning, doweling or splining, and the converging grooves are made of a length greater than that of the clamp. The latter is placed in position at the convergent ends of the grooves and firmly driven or wedged in place, thus rigidly and permanently keying the work together. The clamp is placed on the rear or unexposed surface of the work and is in a plane substantially parallel to the faces of the abutting members, there being practically no protruding portions. This is an important consideration because of the necessity for placing material of the type on which the clamp is primarily intended to be used as close to the wall as possible.

The advantages of my invention will be apparent. It will be seen that by means of a very simple wedge-shaped clamping plate and the provision of convergent grooves in the work of corresponding formation to the key angles of the clamp I am enabled to quickly and permanently set up hardwood and other construction work such as cabinet trim, paneling, wainscoting, door trims and usual inside finish which has been completely prepared at the mill or factory, and that the use of nails or screws in making joint is obviated with a consequent lessening of liability to damage the material by splitting or other disfigurements.

I claim as my invention:

In a locking clamp for frame joints, the combination with two abutting frame members each having a groove cut into its face adjacent the meeting edges of said members, said grooves being convergently disposed, of a resilient metallic wedge-shaped plate adapted to span said edges, said plate having its ends provided with flanges for interlocking with said grooves and its intermediate body portion curved outwardly so as to be free from contact with the members when in assembled position, whereby a constant pressure is exerted on the abutting edges of the members and provision is made for swelling or shrinkage due to temperature or climatic changes.

In testimony whereof, I have signed this specification in the presence of two subscribing witnesses.

JOSEPH PHILIP TURNER.

Witnesses:
RAYMOND E. KRAPE,
W. A. DEEGON.